Patented Nov. 15, 1938

2,136,373

UNITED STATES PATENT OFFICE 2,136,373

SOFTENED RUBBER

Warren F. Busse, Cuyahoga Falls, Ohio, assignor to The B. F. Goodrich Company, New York, N. Y., a corporation of New York No Drawing. Application October 24, 1935, Serial No. 46,564

4 Claims. (Cl. 18—50)

This invention relates to the problem of increasing the plasticity of crude rubber to improve its properties and make it process more easily in the factory.

Before solid rubber can be mixed with pigments, sulfur, accelerators and other compounding ingredients, it is necessary to change it from a tough elastic material to one which is softer and more plastic, so that it will flow around the pigments which are added to the compound, and thus give a uniform dispersion of the non-rubber particles throughout the mass. Present methods of breaking down the rubber require heavy cumbersome machinery such as mills, plasticators, heaters, etc., which consume large amounts of energy and break down the rubber at relatively slow rates. It is believed (see Cotton, Trans. I. R. I. 6, 487, 1931; Busse, Ind. & Eng. Chem. 24, 140, 1932; Dufraisse, Rev. Gen. du Caoutchouc No. 86, p. 15, Nov. 1932) that the breakdown is due to oxidation processes, and that the rate of oxidation is accelerated by the mechanical strains produced during milling, or by exposure to light, or by increased temperatures, or by an activation of the oxygen, e. g., by the use of ozone or hydrogen peroxide, etc.

One object of the present invention is to increase the rate of breakdown of the rubber during the usual factory operations of milling, plasticating, etc., where the rubber is mechanically distorted or heated in the presence of normal or activated oxygen or of compounds which liberate activated oxygen. Another object of this invention is to prepare a rubber that will dissolve in the usual solvents to give solutions of low viscosity even at relatively high concentrations. Other objects of this invention are to prepare rubbers which will give improved dispersion of gas black and other pigments, and to secure rubbers which will give cured compounds having superior physical properties. Still other objects will be apparent from the description of this invention.

These objects are accomplished in accordance with this invention by treating the unvulcanized rubber with small proportions of a hydrazine in which at least the two hydrogens on one nitrogen remain unsubstituted. The class of compounds which may be employed in the practice of this invention accordingly includes the parent compound, hydrazine, as well as derivatives in which one or two hydrocarbon radicals, or radicals which have essentially the properties of hydrocarbon radicals, such as ethyl, butyl, cyclohexyl, benzyl, phenyl, tolyl, xylyl, cumyl, xenyl, naphthyl, anthracyl, indanyl, chlorphenyl, nitrophenyl, alkoxy-phenyl, furyl, quinolyl and the like, occupy positions on a single one of the two nitrogens. The preferred compounds are monoaromatic substituted hydrazines such as phenylhydrazine and beta-naphthyl hydrazine. The rubber may be treated with one or more of these compounds at any stage of its preparation before the final mixing. They are particularly effective in softening and breaking down the rubber when added thereto at the beginning of the mastication or plasticizing process.

The free bases of the hydrazine derivatives may be used, or it may be more convenient to add the compounds in the form of their salts with organic or inorganic acids or their molecular addition compounds with other materials such as zinc acetate, cobalt acetate, $SO_2$ etc., it being understood that the claims unless otherwise limited, cover the use of the compounds either free or in the form of salts or addition complexes. If the double salt contains cobalt, copper or manganese, it is, of course, necessary to add an antioxidant after obtaining the desired initial breakdown to prevent a continued deterioration of the rubber.

Compounds in which the substituent radicals are not substantially hydrocarbon in nature, such as radicals which are strongly acidic or basic or which contain carbonyl groups, are substantially inactive. Even such electropositive groups as nitro groups tend to diminish the activity of the compounds. For example, in the series 2, 4, 6 trinitrophenylhydrazine hydrochloride, 2, 4 dinitrophenyl hydrazine hydrochloride, 2 nitrophenyl hydrazine hydrochloride, and phenylhydrazine hydrochloride, the first member has relatively little softening effect and on heating actually causes a stiffening due to the curing action of the trinitrobenzol that is formed. On decreasing the number of nitro groups in this series the activity markedly increases, the phenylhydrazine under certain conditions being over thirty times as effective a softener as some of the best commercial softeners on the market today.

It is probable that these chemicals combine with oxygen to form peroxides which then attack the rubber and cause a "disaggregation" or chemical breakdown of the structural units that are present in crude rubber. It is also possible that they react with peroxides or oxidation products in the rubber to accelerate the breakdown, but whatever the mechanism of the breakdown may be, the effect is that the chemicals act as promoters or accelerators of the breakdown of rubber, and it is not intended to limit this invention to any particular theory of the mechanism of the reactions which may occur.

In practicing this invention the chemicals are added to the rubber in small proportions, quantities between 0.05 and 1.0% on the rubber usually being satisfactory. Larger amounts may be used without causing porosity or appreciably affecting the cure if the rubber is given sufficient milling, heating, and/or aging before the sample is cured to oxidize or otherwise decompose the chemical.

If the chemical are being added during mastication in the factory, it is, of course, advisable to add them at an early stage so they will have a greater chance to act on the rubber. It is also advisable to add the chemicals early in the masticating process because certain pigments which may be added during the mixing operations may reduce or even destroy the effectiveness of the chemicals.

It has been found, for example, that if 1% of phenylhydrazine is added to a batch in an internal mixer, and two minutes later one starts adding 30 volumes of gas black to the rubber, the hydrazine causes little if any increase in placticity and does not improve the dispersion. However, if the rubber is first broken down with the phenylhydrazine alone it becomes very plastic and if the gas black is added after the batch has aged for a day or two, it then gives a better dispersion of gas black and a higher plasticity of the batch than does similar rubber not treated with phenylhydrazine. Other pigments such as zinc oxide have relatively little effect on the softening action of compounds such as phenylhydrazine, while the stiffening effect of strongly basic materials such as CaO or MgO tends to neutralize the softening caused by hydrazine derivatives, especially at higher temperatures. If sulfur is present in the batch when phenylhydrazine is added, or if the two are added at about the same time, the effectiveness of the hydrazine derivative is much reduced.

The temperature at which the chemicals are most effective will vary for different members of this class, depending upon the volatility, stability, conditions of mixing, etc., but the optimum conditions for any given chemical can easily be determined by one skilled in the art. Hydrazine has been found to give the best results at comparatively high temperatures, between 200 and 350° F.

The following examples illustrate specific embodiments of this invention, but they are not intended to limit its scope.

*Example I.*—Seven hundred-gram batches of smoked sheets were masticated in a small internal mixer at 240° F. After three minutes breakdown of the rubber the desired amount of phenyl hydrazine was added and the milling was continued for a total of twenty minutes. Plasticity measurements were made on the masticated batches at 70° C. with the Goodrich plastometer after the samples had stood over night. The results are shown below. The initial plasticity of the rubber was 7.0.

| Amount of phenylhydrazine added (per cent) | 0 | 0.01 | 0.03 | 0.1 | 0.33 | 1.0 |
|---|---|---|---|---|---|---|
| Plasticity | 9.4 | 13.3 | 14.9 | 18.0 | 32.4 | 60.1 |
| Increase in plasticity during mastication | 2.4 | 6.3 | 7.9 | 11.0 | 25.4 | 53.1 |

The addition of 1.0% phenylhydrazine increased the rate of breakdown by over twentyfold under these conditions. Under similar conditions the addition of 3.0% of a commercial softener consisting largely of lauric acid and zinc laurate gave a batch having a plasticity of 18.6.— about the same as the plasticity produced by 0.1% of phenylhydrazine.

The small quantities of the hydrazines employed in this invention have substantially no influence on the rate of cure. Such effect as they have is to retard rather than to accelerate vulcanization. This is particularly true if they are employed in the form of salts with strong acids.

*Example II.*—Beta-naphthylhydrazine hydrochloride was added to batches masticated the same way as in Example I. After the mastication, samples of each batch were heated for one hour in a mold in a press at temperatures of 280, 320 and 350° F., respectively, and the effect on the plasticity at 158° F. was determined with the results shown below.

| Amount added (per cent) | 0 | 0.1 | 0.5 |
|---|---|---|---|
| Plasticity after mastication | 8.7 | 17.9 | 62.5 |
| Plasticity after mastication, plus 1 hr. at 280° F | 10.8 | 22.1 | 58.3 |
| Plasticity after mastication, plus 1 hr. at 320° | 12.5 | 24.9 | 64.7 |
| Plasticity after mastication, plus 1 hr. at 350° | 17.1 | 37.2 | 69.2 |

*Example III.*—One per cent of each of the following compounds was added to different batches of rubber treated in Example II.

(1) Zinc acetate addition product of phenylhydrazine.
(2) As. diphenylhydrazine hydrochloride.

The plasticity data are shown below.

| Chemical added | (1) | (2) | None |
|---|---|---|---|
| Plasticity after mastication | 66.9 | 20.4 | 9.45 |
| Plasticity after mastication, plus 1 hr. at 280° F | 74.8 | 26.3 | 12.4 |
| Plasticity after mastication, plus 1 hr. at 320° F | | 28.3 | 13.8 |
| Plasticity after mastication, plus 1 hr. at 350° F | | 27.8 | 20.1 |

*Example IV.*—0.075% of phenylhydrazine was added to crude smoked sheets as they went through a Gordon plasticator, and the plasticity of the rubber at 212° F. was determined 24 hours later. Control tests were also made using rubber from the same lot, but adding no phenylhydrazine. The average temperature of the rubber leaving the plasticator was about 320° F. in both sets. The treated rubber had an average plasticity of 14.0, while the control batches had an average plasticity of only 9.7. Gas black was then dispersed in the treated and control rubbers under standard conditions and the degree of dispersion was determined by the method of Allen and Schoenfeld (Ind. & Eng. Chem., 25, 994, 1933) with the following results:

| Rubber | Dispersion of the gas black after mixing for — | | |
|---|---|---|---|
| | 12 min. | 20 min. | 32 min. |
| Control | 68 | 79 | 84 |
| Treated | 71 | 82 | 90 |

The improved dispersion in the treated batch indicates a more effective wetting of the black.

*Example V.*—0.2% of phenylhydrazine zinc acetate salt was added to crude smoked sheets just before entering the Gordon plasticator. In this test the control rubber had a plasticity of 15.8 after leaving the plasticator while rubber treated with the phenylhydrazine zinc acetate compound had a plasticity of 17.8. After the rubber stood three days, the control and treated rubbers were used in tread compounds. The control rubber gave a tread having a plasticity of 8.4 while the tread made from rubber containing phenylhydrazine zinc acetate had a plasticity of 10.3. The dispersion of gas black was better in the treated rubber than in the controls and the rate of cure and the tensile properties of the two compounds were the same.

*Example VI.*—Four batches were masticated in an internal mixer as described in Example I. Batch No. 1 was the control, No. 2 contained 5% sulfur, No. 3 had 0.2% phenylhydrazine and 5% sulfur, the two being added at about the same time, and No. 4 had 0.2% phenylhydrazine. The results are shown in Table VII.

| Batch | 1 | 2 | 3 | 4 |
|---|---|---|---|---|
| Plasticity after masticating | 9.63 | 13.4 | 17.5 | 27.8 |

This shows that the greatest effects are obtained with phenylhydrazine when it is allowed to act in the absence of sulfur.

While I have herein disclosed with considerable particularity certain preferred manners of performing my invention, I do not thereby desire or intend to limit myself solely thereto, for, as hitherto stated, the procedure may be modified, the precise proportions of the materials utilized may be varied and other materials having equivalent chemical properties may be employed if desired without departing from the spirit and scope of the invention as defined in the appended claims.

I claim:

1. The process of promoting the breakdown of rubber which comprises treating crude rubber with a small proportion of hydrazine.

2. The process of promoting the breakdown of rubber which comprises adding hydrazine to crude rubber and exposing the rubber to a high temperature substantially between 200 and 350° F.

3. Uncured rubber which has been broken down through the addition of hydrazine.

4. In the art of compounding rubber, the step of plasticizing unvulcanized rubber which consists in subjecting the rubber, in the absence of more than 5% of sulfur, to sufficient amounts of phenyl hydrazine for a sufficient length of time for said hydrazine to effect a marked increase in the capacity of the rubber to flow under a load over that which the rubber would have if subjected to the same conditions in the absence of said hydrazine.

WARREN F. BUSSE.

DISCLAIMER 2,136,373.—*Warren F. Busse*, Cuyahoga Falls, Ohio. SOFTENED RUBBER. Patent dated November 15, 1938. Disclaimer filed November 25, 1938, by the assignee, *The B. F. Goodrich Company*.

Hereby enters this disclaimer of claim 4 of the patent.

[*Official Gazette December 20, 1938.*]

this test the control rubber had a plasticity of 15.8 after leaving the plasticator while rubber treated with the phenylhydrazine zinc acetate compound had a plasticity of 17.8. After the rubber stood three days, the control and treated rubbers were used in tread compounds. The control rubber gave a tread having a plasticity of 8.4 while the tread made from rubber containing phenylhydrazine zinc acetate had a plasticity of 10.3. The dispersion of gas black was better in the treated rubber than in the controls and the rate of cure and the tensile properties of the two compounds were the same.

*Example VI.*—Four batches were masticated in an internal mixer as described in Example I. Batch No. 1 was the control, No. 2 contained 5% sulfur, No. 3 had 0.2% phenylhydrazine and 5% sulfur, the two being added at about the same time, and No. 4 had 0.2% phenylhydrazine. The results are shown in Table VII.

| Batch | 1 | 2 | 3 | 4 |
|---|---|---|---|---|
| Plasticity after masticating | 9.63 | 13.4 | 17.5 | 27.8 |

This shows that the greatest effects are obtained with phenylhydrazine when it is allowed to act in the absence of sulfur.

While I have herein disclosed with considerable particularity certain preferred manners of performing my invention, I do not thereby desire or intend to limit myself solely thereto, for, as hitherto stated, the procedure may be modified, the precise proportions of the materials utilized may be varied and other materials having equivalent chemical properties may be employed if desired without departing from the spirit and scope of the invention as defined in the appended claims.

I claim:

1. The process of promoting the breakdown of rubber which comprises treating crude rubber with a small proportion of hydrazine.

2. The process of promoting the breakdown of rubber which comprises adding hydrazine to crude rubber and exposing the rubber to a high temperature substantially between 200 and 350° F.

3. Uncured rubber which has been broken down through the addition of hydrazine.

4. In the art of compounding rubber, the step of plasticizing unvulcanized rubber which consists in subjecting the rubber, in the absence of more than 5% of sulfur, to sufficient amounts of phenyl hydrazine for a sufficient length of time for said hydrazine to effect a marked increase in the capacity of the rubber to flow under a load over that which the rubber would have if subjected to the same conditions in the absence of said hydrazine.

WARREN F. BUSSE.

DISCLAIMER 2,136,373.—*Warren F. Busse*, Cuyahoga Falls, Ohio. SOFTENED RUBBER. Patent dated November 15, 1938. Disclaimer filed November 25, 1938, by the assignee, *The B. F. Goodrich Company*.

Hereby enters this disclaimer of claim 4 of the patent.

[*Official Gazette December 20, 1938.*]